(12) United States Patent
Hopp

(10) Patent No.: US 7,909,377 B2
(45) Date of Patent: Mar. 22, 2011

(54) LAWN AND GARDEN DEBRIS SCOOP

(76) Inventor: Keith E. Hopp, Williamson, NY (US)

( * ) Notice: Subject to any disclaimer, the term of this patent is extended or adjusted under 35 U.S.C. 154(b) by 65 days.

(21) Appl. No.: 12/399,958

(22) Filed: Mar. 8, 2009

(65) Prior Publication Data

US 2010/0013252 A1    Jan. 21, 2010

Related U.S. Application Data

(60) Provisional application No. 61/080,991, filed on Jul. 15, 2008.

(51) Int. Cl.
*A01B 1/02* (2006.01)
*A01B 1/20* (2006.01)
*A01D 11/06* (2006.01)
*A01D 7/10* (2006.01)

(52) U.S. Cl. ...... 294/50.8; 294/55; 15/257.2; 56/400.04

(58) Field of Classification Search ............ 294/1.3–1.5, 294/50.5, 50.9, 55, 57; 15/257.1, 257.2, 15/257.7, 257.9; 56/400.04, 400.12, 400.16; D30/162
See application file for complete search history.

(56) References Cited

U.S. PATENT DOCUMENTS

| | | | | |
|---|---|---|---|---|
| 911,291 A | | 2/1909 | Byor | |
| 926,927 A | * | 7/1909 | Devol | 15/257.2 |
| 2,521,441 A | | 9/1950 | Bickley | |
| 3,324,494 A | * | 6/1967 | Vosbikian | 15/257.2 |
| 4,222,597 A | * | 9/1980 | Willis | 294/1.4 |
| 4,772,057 A | | 9/1988 | Harvey | |
| 4,881,332 A | | 11/1989 | Evertsen | |
| 5,367,737 A | * | 11/1994 | Vosbikian et al. | 15/257.2 |
| 5,379,481 A | * | 1/1995 | DeMars | 15/257.2 |
| 5,487,577 A | | 1/1996 | Ball | |
| 5,499,852 A | | 3/1996 | Seigendall | |
| D381,778 S | * | 7/1997 | Semo | 294/1.4 |
| 5,669,651 A | | 9/1997 | Vroegindewey | |
| 5,704,672 A | | 1/1998 | Sims | |
| 5,732,933 A | | 3/1998 | Champi | |
| 5,788,299 A | | 8/1998 | Wilkinson | |
| 5,921,596 A | | 7/1999 | Sheriff et al. | |
| 6,030,011 A | * | 2/2000 | Layton | 294/1.4 |
| 6,052,860 A | * | 4/2000 | Coxsey | 15/257.2 |
| 6,128,979 A | | 10/2000 | Shepherd | |
| 6,464,272 B1 | | 10/2002 | Michaud | |
| 6,478,351 B1 | * | 11/2002 | Nelson | 294/1.4 |
| 6,485,076 B1 | | 11/2002 | Chang | |
| 6,520,554 B2 | * | 2/2003 | Ditzik | 294/1.1 |
| 6,830,271 B2 | | 12/2004 | Piscopo et al. | |

(Continued)

*Primary Examiner* — Paul T Chin
(74) *Attorney, Agent, or Firm* — Berenato & White, LLC

(57) ABSTRACT

The lawn scoop is designed to make picking up any type of small, loose debris a cleaner and easier task for the user. In general terms, the device is a scoop type shovel with the addition of a multipurpose hook/guide at the top end of the handle. After raking or sweeping the debris into a pile, the user stands in front of the debris and attaches the hook/guide part of the scoop to their front pant pocket or belt. This keeps the scoop at the proper angle while enabling the user to use both hands to rake or sweep the debris onto the scoop. Then, by placing the rake or broom over the top of the scoop, aligning the handles of both the scoop and rake using the hook/guide, the user holds both handles together for lifting and disposal. The hook/guide is also designed as part of the hanging system which provides for convenient storage of the combination of scoop and rake/broom.

6 Claims, 3 Drawing Sheets

U.S. PATENT DOCUMENTS 7,077,444 B2 7/2006 Kaufman et al.
7,124,536 B2 10/2006 Harkey
2004/0090073 A1* 5/2004 Edwards et al. ............... 294/1.3

* cited by examiner

LAWN AND GARDEN DEBRIS SCOOP

This application claims the benefit of prior filed U.S. provisional application Ser. No. 61/080,991, filed Jul. 15, 2008.

BACKGROUND OF THE INVENTION

1. Field of the Invention

The invention relates generally to a lawn and garden debris scooping and removal equipment and related methods.

2. Background

Yard waste removal is an age old issue for the homeowner/grounds keeper. Endless tasks, wind driven debris, errant pets, seasonal clean-up all require raking/sweeping and pick-up removal by a dedicated persistent individual. It is the rare instance when all of the yard debris requiring removal can be merely ridden over in some form of automatic conveyance that miraculously deposits everything to be removed neatly into readily disposable bags, collectors, etc. More often than not, old fashioned hands-on work is required. This can be dirty, messy, and slow, not to mention physically taxing with the repeated back bending twisting, etc. Other known solutions to lawn and garden debris removal either do not prevent the user from directly contacting the debris, or are not as efficient in the lifting of debris.

SUMMARY OF THE INVENTION

The present invention advantageously fills the aforementioned deficiencies by providing a lawn and garden debris scoop.

The lawn scoop of the present invention is simpler in design than that of a mechanically hinged type of contraption and can lift a greater volume of debris more efficiently. The hook/guide design of the lawn scoop herein has no moving parts so it is more durable than other designs and, in addition, the hook/guide performs multiple functions including hanging for storage.

The lawn scoop herein enables the user to lift lawn and garden debris for disposal with minimal mess or bending. Whether the debris is to be placed into a trash can, wheelbarrow, compost pile or other container, the material is not contacted directly by the user. This is not only cleaner for the user if picking up wet leaves, but safer if disposing of items such as thorny rose or raspberry bush clippings, cut poison ivy plants or grass clippings contaminated with animal droppings.

The unique design of the hook/guide accomplishes three functions, 1) positioning the scoop for loading, 2) stabilizing for lifting the debris and 3) hanging the scoop for storage.

The lawn and garden scoop of the present invention is used in conjunction with a rake or broom to lift debris for disposal. After raking or sweeping the debris into a pile with a rake or broom, the user attaches the lawn scoop with the hook/guide to their front pant pocket or belt. This positions the scoop so that the user can use both hands to rake or sweep the debris onto the blade of the scoop. The rake or broom handle is then placed in a parallel manner on top of the scoop handle with the fan portion of the rake or brush part of the broom placed on top of the debris. This combination holds the debris on the scoop. The hook/guide aligns the handles, enabling the user to hold the handles of both tools in place while lifting the debris.

The hook/guide is also designed as part of the hanging system which allows for convenient storage of both the lawn scoop and rake or broom. The rake or broom is modified with the placement of a pin in the handle. The pin aids in the alignment when the handles are placed together for lifting debris and it supports the rake or broom for hanging.

Optional features would be in potential uses for the scoop. In addition to lifting lawn and garden debris the scoop can be used to aid in lifting shop debris, sawdust, wood chips and small scrap pieces or it can be used as a heavy duty dust pan for any other type of debris.

Other solutions/inventions used for picking up loose debris either require the user to bend over and pick up the debris using fan shaped items placed on their hands, or some type of hinged combination that is far less efficient. The lawn scoop does not use a hinge connection to position the rake or broom with the scoop but instead uses a unique hook/guide. None of the known devices for similar work contain the unique multipurpose hook/guide that is used to position the scoop, stabilize the two tools for lifting debris and is used as part of the hanging system for storage.

The lawn scoop is designed so that the handle of the scoop, the top of the blade and the front edge of the blade are all on the same plane. This enables the rake or broom used in conjunction with the lawn scoop to lay flat on the scoop to secure the debris while lifting.

Additionally, the unique design of the hook/guide serves to perform multiple functions. Of the inventions I reviewed none had a multifunctional hook/guide that would secure the scoop to the user at the proper angle, help stabilize the two tools together while lifting and used as part of the hanging system for storage.

Procedurally, other inventions are hinged together which changes how the implement is used. In the lawn scoop of the present invention, the debris is raked or swept into a pile using a rake or broom then the rake or broom is used in conjunction with the lawn scoop to secure and lift the debris.

Finally, it is an object of the present invention to provide a lawn and garden debris scoop that does not suffer from any of the problems or deficiencies associated with prior solutions.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
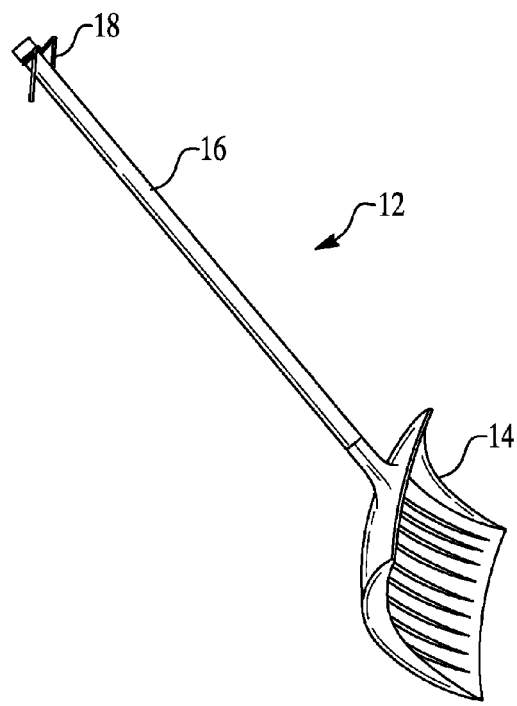
FIG. 1 is an illustration of the scoop with hook/guide.
Figure 2:
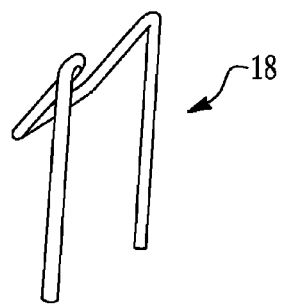
FIG. 2 is an illustration of the hook/guide separated from the scoop.

The present invention is directed to a lawn and garden debris scoop.

The lawn and garden scoop 12 is used in conjunction with a rake 10 or broom 11 to easily lift debris with minimal bending. The lawn scoop 12 is designed so the shaft of the handle 16, the top of the blade 14 and the front of the blade are on the same plane. This allows the debris to be securely held on the blade 14 of the scoop 12 when the rake 20 or broom 21 handle is placed in the hook/guide 18 on top of the scoop handle 16.

Figure 5:
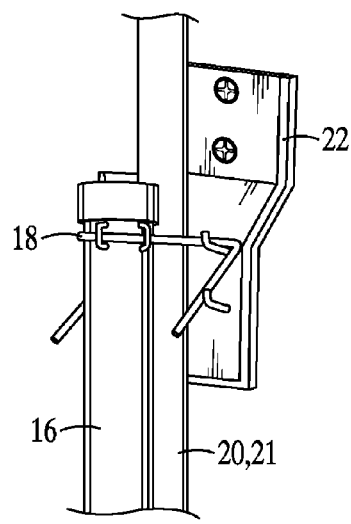
FIG. 5 is an illustration of the scoop with hanger.
Figure 11:
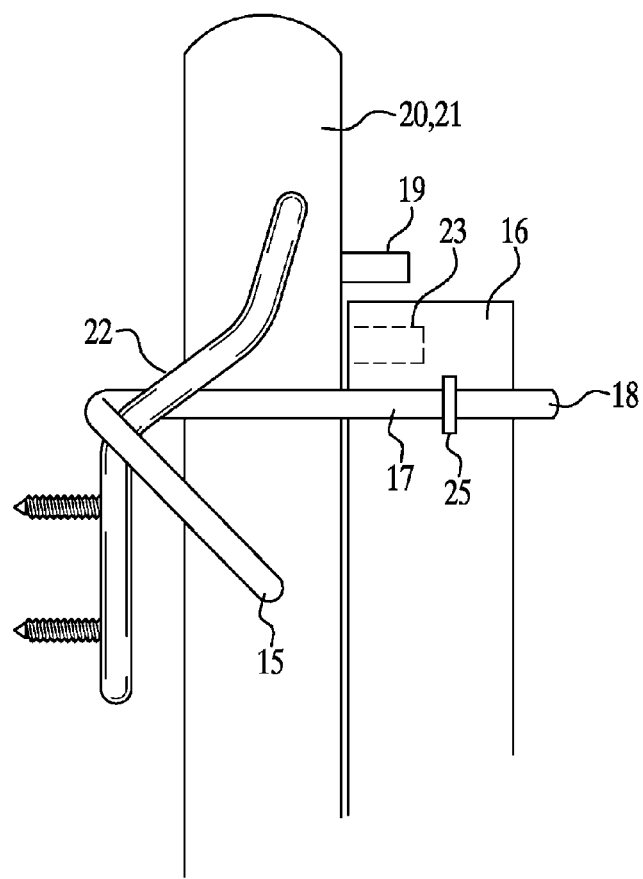
FIG. 11 is the hanger shown in FIGS. 9 and 10 engaged with the debris scoop/broom or rake combination.

The lawn scoop 12 incorporates a unique hook/guide 18 located at the top of the handle 16 that has three main functions 1) securely attaches the scoop 12 to the user at the proper angle, 2) guides the handles (16 and either of 20 or 21) of the two tools in the proper position to hold the debris to the scoop and 3) used to hang the scoop/rake 10 or scoop/broom 11 combination to the wall for storage (see FIGS. 5, 11).

The first function is to hold the scoop at the proper angle while attached to a front pant pocket 24 or belt. This allows the user, with the scoop 12 securely held in position, to use both hands to rake 20 or sweep 21 the debris onto the blade of the scoop 12 while simultaneously keeping the scoop 12 at the proper angle.

Figure 3:
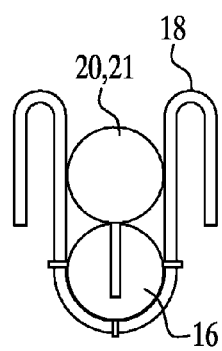
FIG. 3 is an illustration of the top view of the rake or broom and scoop combination.
Figure 4:
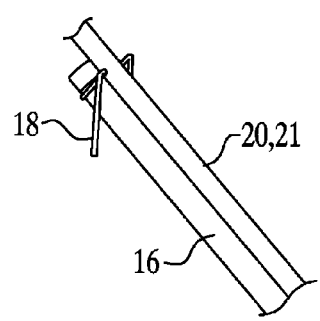
FIG. 4 is an illustration showing a detailed side view of the scoop and rake or broom combination.

The second function of the hook/guide 18 is to keep the handles of the two tools (rake/scoop or broom/scoop) together in a parallel position (see FIGS. 3 and 4) while the user lifts the debris into the disposal can or other container. With the fan of the rake or brush portion of the broom pressing down, the debris is pinched in place between the two tools. The hook/guide 18 holds the handles of the two tools from slipping out of position. With the user pressing the handles of the two tools together the debris can be easily lifted for disposal.

Figure 9:
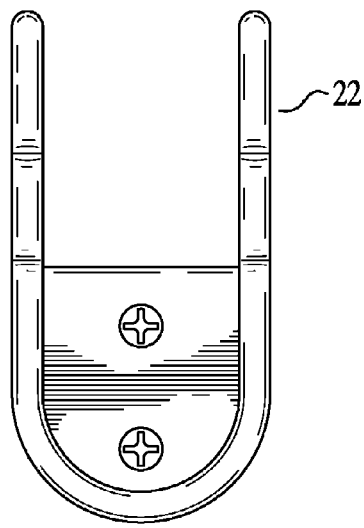
FIG. 9 is plan view of an alternative wall mounted hanger for the debris scoop/broom or rake combination.
Figure 10:
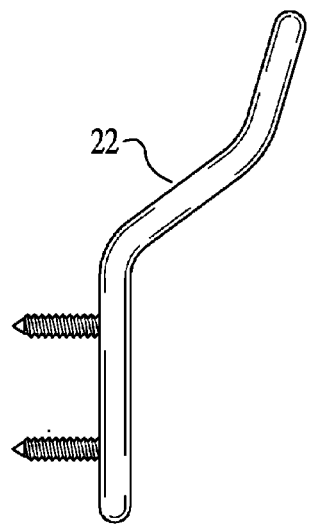
FIG. 10 is a side view of the hanger shown in FIG. 9.

The hook/guide 18 also functions as a hanger to store the scoop/rake or scoop/broom combination as shown in FIGS. 5 and 11 wherein the scoop/rake combination 10 is shown suspended on hanger 22. The hook/guide 18 is shaped so as to interlock with a "U" shaped bracket 22 that is fastened to a wall. An alternative form of the hanger (bracket) 22 is shown in FIGS. 9 and 10, and is shown in use in FIG. 11. The hanger 22 mounts using screws (or other pass through fastener) to an underlying support (wall, stud, etc.) and presents a pair of upright elements for the hook/guide to engage and secure the downwardly disposed leg portions of the hook/guide 18.

The lawn scoop is used for garden or lawn debris removal. It is also useful in workshops in conjunction with a broom to clean up wood or metal shavings. If a smaller amount of debris is to be removed, the debris is swept or raked onto the scoop and used as a heavy duty dust pan without having to secure the material with a second tool. In heavier use, a user secures the scoop handle to their apparel via an extended reversed hooked leg element 15 of the hook/guide 18 inserted into a user's pocket or belt-loop, and proceeds to rake/sweep debris toward the grounded scoop. When the sweeping/raking concludes, the respective handles 16 and 20/21 can be aligned and pinned together for coordinated grasping of the scooped debris using one or both hands.

Figure 6:
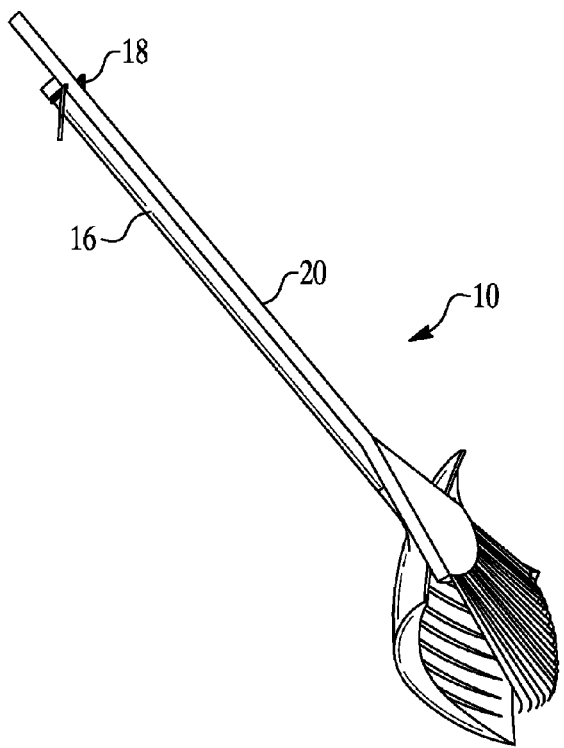
FIG. 6 is the perspective view of the lawn and garden debris scoop with rake.
Figure 7:
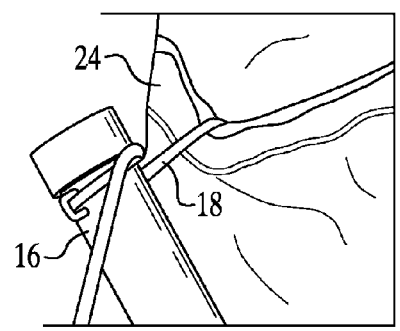
FIG. 7 is an illustration showing hook inserted during use into user pant pocket.
Figure 8:
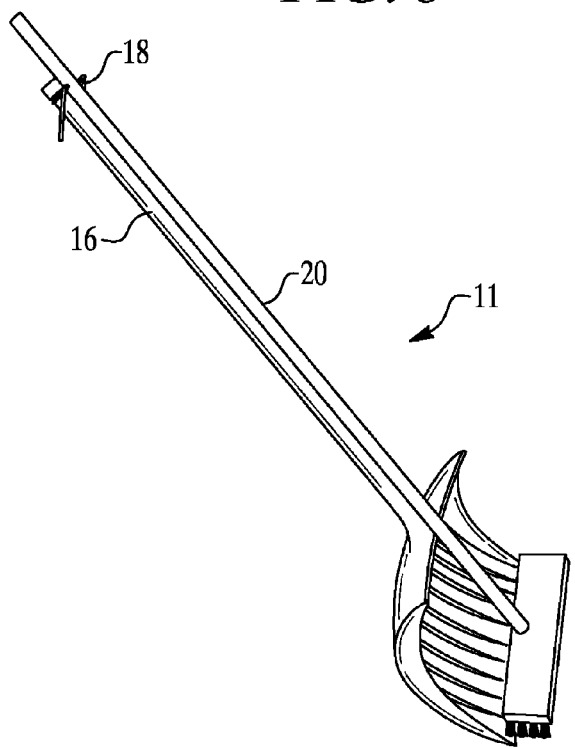
FIG. 8 is the prospective view of the lawn and garden debris scoop with broom.

The hook/guide 18 is generally comprised of a U-shaped segment 17 and reversed hooked leg elements 15 continuously connected/formed from the U-shaped segment. In dimension, the depth of the U-shaped element 17 should be sufficient to capture both the scoop handle 16 and the full cross section of the broom or shovel 20, 21 so that the guide and trapping function, shown in FIGS. 3, 4, 6 and 8, can be accomplished. The extended handle of either the broom 21 or shovel 20 is aligned alongside the scoop handle 16 and enables a user, even single handed, to grasp the respectively aligned handles lower toward the tool end so as to lift and manipulate debris with relative ease of purpose. The free hand can remove a garbage can lid, etc. to enable disposal of the scooped and trapped debris. The hook/guide is attached to a distal end of a scoop handle 16 using fasteners (i.e., staples 25, u-shaped nails) or glue that firmly relate the U-shaped segment 17 to the surface of the scoop handle 16. The scoop handle is also equipped with a blind hole 23 to accommodate a pin element 19 placed into each of the rake and broom handles, respectively, so as to maintain the relative alignment of the scoop and rake/broom handles in use (see FIGS. 6, 8).

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims It is indeed intended that the scope of the invention should be determined by proper interpretation and construction of the appended claims and their legal equivalents, as understood by those of skill in the art relying upon the disclosure in this specification and the attached drawings.

The invention claimed is:

1. A lawn and garden debris scoop, comprising:
   a scoop shaped blade oriented in a first forward direction including a first longitudinal handle attached to said blade at a fixed end of said first handle and extending upwardly from said blade to a free end of said first handle, said free end further including a U-shaped hook element attached to said free end wherein leg elements of said U-shaped hook extend in said first forward direction beyond an opposed side of said first handle at least a distance approximating a thickness of said first handle when said first handle is nestled in a bottom of said U-shape hook, at least one leg of said hook including a reverse downward and rearwardly directed bend so as to engage a support positioned rearwardly from said scoop so as to suspend said scoop from said support.

2. A lawn and garden debris scoop as in claim 1, further comprising:
   a rake including a second longitudinal handle similar in size and overall shape to said first handle, said second handle being placed parallel to and alongside said first handle so as to enable said rake and scoop to act in unison to clamp debris between said scoop blade and said rake.

3. A lawn and garden debris scoop as in claim 2, further comprising:
   a pin fixed into said second longitudinal handle of said rake, said pin extending into a receiving hole in said first handle when said respective handles are in parallel relation.

4. A lawn and garden debris scoop as in claim 1, further comprising:
   a broom including a second longitudinal handle similar in size and overall shape to said first handle, said second handle being placed parallel to and alongside said first handle so as to enable said broom and scoop to act in unison to clamp debris between said scoop blade and said broom.

5. A lawn and garden debris scoop as in claim 4, further comprising:

a pin fixed into said second longitudinal handle of said broom, said pin extending into a receiving hole in said first handle when said respective handles are in parallel relation.

6. A method of scooping and removing debris, comprising the steps of:

selecting a debris scoop including a scoop shaped blade oriented in a first forward direction including a first longitudinal handle attached to said blade at a fixed end of said first handle and extending upwardly from said blade to a free end of said first handle, said free end further including a U-shaped hook element attached to said free end wherein leg elements of said U-shaped hook extend in said first forward direction beyond an opposed side of said first handle at least a distance approximating a thickness of said first handle when said first handle is nestled in a bottom of said U-shape hook, at least one leg of said hook including a reverse downward and rearwardly directed bend so as to engage a support;

engaging said one leg of said hook onto an item of wearable apparel of a user of said debris scoop so as to support said scoop in position to receive debris and move said scoop in a hands free manner as said user moves through movement of a user's apparel;

guiding debris to said scoop while it is suspended from said hook engaged on said apparel.

\* \* \* \* \*